US012475982B1

(12) United States Patent
Mouléne et al.

(10) Patent No.: US 12,475,982 B1
(45) Date of Patent: Nov. 18, 2025

(54) SYSTEMS AND METHODS FOR PERSONALIZED TREATMENT

(71) Applicant: Auggie Holdings, Inc., Los Angeles, CA (US)

(72) Inventors: Cameron Alan Jean Bales Mouléne, Los Angeles, CA (US); Alexander Rowland, Calabasas, CA (US)

(73) Assignee: Auggie Holdings, Inc., Los Angeles, CA (US)

( * ) Notice: Subject to any disclaimer, the term of this patent is extended or adjusted under 35 U.S.C. 154(b) by 0 days.

(21) Appl. No.: 18/794,316

(22) Filed: Aug. 5, 2024

(51) Int. Cl.
G16H 50/20 (2018.01)
G16H 10/20 (2018.01)
G16H 20/00 (2018.01)
G16H 50/30 (2018.01)
H04L 51/02 (2022.01)

(52) U.S. Cl.
CPC ............ *G16H 20/00* (2018.01); *G16H 10/20* (2018.01); *G16H 50/20* (2018.01); *G16H 50/30* (2018.01); *H04L 51/02* (2013.01)

(58) Field of Classification Search
CPC ........ G16H 50/20; G16H 50/30; G16H 10/20; G16H 20/00; H04L 51/02
See application file for complete search history.

(56) References Cited

U.S. PATENT DOCUMENTS

| | | | | |
|---|---|---|---|---|
| 11,056,242 | B1 * | 7/2021 | Jain | G16H 10/60 |
| 11,342,051 | B1 * | 5/2022 | Jain | G16H 10/60 |
| 12,112,839 | B2 * | 10/2024 | Colley | G16H 20/10 |
| 2010/0191100 | A1 * | 7/2010 | Anderson | G06T 7/246 |
| | | | | 600/424 |

(Continued)

FOREIGN PATENT DOCUMENTS

| | | | |
|---|---|---|---|
| IN | 202341053268 A | | 9/2023 |
| IN | 202441053835 A | * | 7/2024 |
| KR | 20200065350 A | | 6/2020 |
| KR | 20220068594 A | | 5/2022 |
| KR | 20220159806 A | | 12/2022 |
| KR | 20230104966 A | * | 7/2023 |

(Continued)

OTHER PUBLICATIONS

Sunithanandhini.A et al., "Advanced Chatbots for Home Patients using AI," Proceedings of the 7th International Conference on Trends in Electronics and Informatics (ICOEI 2023); IEEE Xplore Part No. CFP23J32-ART; ISBN: 979-8-3503-9728-4; DOI: 10.1109/ICOEI56765.2023.10125886 (Year: 2023).*

"Advantages and Disadvantages of Deep Learning," https://www.geeksforgeeks.org/advantages-and-disadvantages-of-deep-learning/ (Year: 2023).*

(Continued)

*Primary Examiner* — Jonathon A. Szumny
(74) *Attorney, Agent, or Firm* — Caldwell Intellectual Property Law

(57) ABSTRACT

A system for personalized treatment, the system including an input device, at least a processor and a memory communicatively connected to the at least a processor, the memory containing instructions configuring the at least a processor to retrieve physiological data from at least the input device associated with a user, wherein the physiological data further includes a previous ailment, receive an ailment inquiry from the user generate a treatment response as a function of the physiological data and the ailment inquiry including inputting the ailment inquiry into a large language model and generating the treatment response as a function ailment, inquiry, the physiological data and the large language model and transmit the treatment response to at least the input device.

20 Claims, 7 Drawing Sheets

(56) References Cited

U.S. PATENT DOCUMENTS

| | | | |
|---|---|---|---|
| 2015/0269348 A1* | 9/2015 | Madjd | G16H 50/30 |
| | | | 705/2 |
| 2018/0226143 A1* | 8/2018 | Khashman | G06F 16/254 |
| 2019/0279767 A1* | 9/2019 | Bates | G16H 40/63 |
| 2020/0194121 A1* | 6/2020 | Kupershmidt | G16H 80/00 |
| 2020/0258639 A1* | 8/2020 | Tschulena | G16H 50/50 |
| 2020/0411199 A1* | 12/2020 | Shrager | G16H 70/40 |
| 2021/0272659 A1* | 9/2021 | Chrysopoulo | G16H 80/00 |
| 2021/0335491 A1* | 10/2021 | Morris | G16H 50/50 |
| 2021/0407672 A1* | 12/2021 | Zumbrun | G16H 20/10 |
| 2022/0310253 A1* | 9/2022 | Ferro, Jr. | G06T 19/006 |
| 2023/0157811 A1* | 5/2023 | Hallen | G16H 20/30 |
| | | | 351/206 |
| 2023/0215543 A1* | 7/2023 | Darcy | G16H 50/70 |
| 2023/0352134 A1* | 11/2023 | Hasan | G16H 20/00 |
| 2023/0352142 A1* | 11/2023 | Rosenberg | A63B 21/00178 |
| 2024/0096455 A1* | 3/2024 | Holes | G16H 10/20 |
| 2024/0170122 A1* | 5/2024 | Neumann | G16H 10/20 |

FOREIGN PATENT DOCUMENTS

| | | | | |
|---|---|---|---|---|
| KR | 20240027259 A | * | 3/2024 | |
| WO | WO-2024144460 A1 | * | 7/2024 | ............ G16H 10/60 |

OTHER PUBLICATIONS

Muttineni et al., "An Interactive Interface for Patient Diagnosis using Machine Learning Model," 2022 2nd International Conference on Emerging Frontiers in Electrical and Electronic Technologies (ICEFEET) | 978-1-6654-8875-4/22/$31.00 © 2022 IEEE | DOI: 10.1109/ICEFEET51821.2022.9848074 (Year: 2022).*

Kumar et al., "Diseases Prediction based on Symptoms using Database and GUI," Proceedings of the Sixth International Conference on Computing Methodologies and Communication (ICCMC 2022); IEEE Xplore Part No. CFP22K25-ART; ISBN: 978-1-6654-1028-1; DOI: 10.1109/ICCMC53470.2022.9753707. (Year: 2022).*

Cosentino et al., "Towards a Personal Health Large Language Model," arXiv:2406.06474v1 [cs.AI] Jun. 10, 2024. (Year: 2024).*

\* cited by examiner

SYSTEMS AND METHODS FOR PERSONALIZED TREATMENT

FIELD OF THE INVENTION

The present invention generally relates to the field of large language models. In particular, the present invention is directed to systems and methods for personalized treatment.

BACKGROUND

Current systems used for medical treatment either require human intervention or provide treatment options that are not personalized to a user. As a result, treatment options may be ineffective or difficult to receive. In addition, current systems utilizing machine learning or large language models to generate treatment options for individuals are lacking and fail to provide personalized treatment. Instead, generated outputs by these systems are generic and fail to provide proper treatment options suitable for each individual.

SUMMARY OF THE DISCLOSURE

In an aspect a system for personalized treatment is described. The system includes an input device, at least a processor and a memory communicatively connected to the at least a processor. The memory contains instructions configuring the at least a processor to, retrieve physiological data from at least the input device associated with a user, wherein the physiological data further includes a previous ailment, receive an ailment inquiry from the user, generate a treatment response as a function of the physiological data and the ailment inquiry including inputting the ailment inquiry into a large language model and generating the treatment response as a function of the ailment inquiry, the physiological data and the large language model and transmit the treatment response to at least the input device.

In another aspect, a method for personalized treatment is described. The method includes retrieving, from at least an input device, physiological data associated with a user, wherein the physiological data further comprises a previous ailment and receiving, by at least a processor, an ailment inquiry from the user. The method further includes generating, by the at least a processor, a treatment response as a function of the physiological data and the ailment inquiry including inputting the ailment inquiry into a large language model and generating the treatment response as a function of ailment inquiry and the large language model scoring each of the one or more treatment response as a function of the physiological data, the ailment inquiry and the large language model. The method further includes transmitting, by the at least a processor, the treatment response to at least the input device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
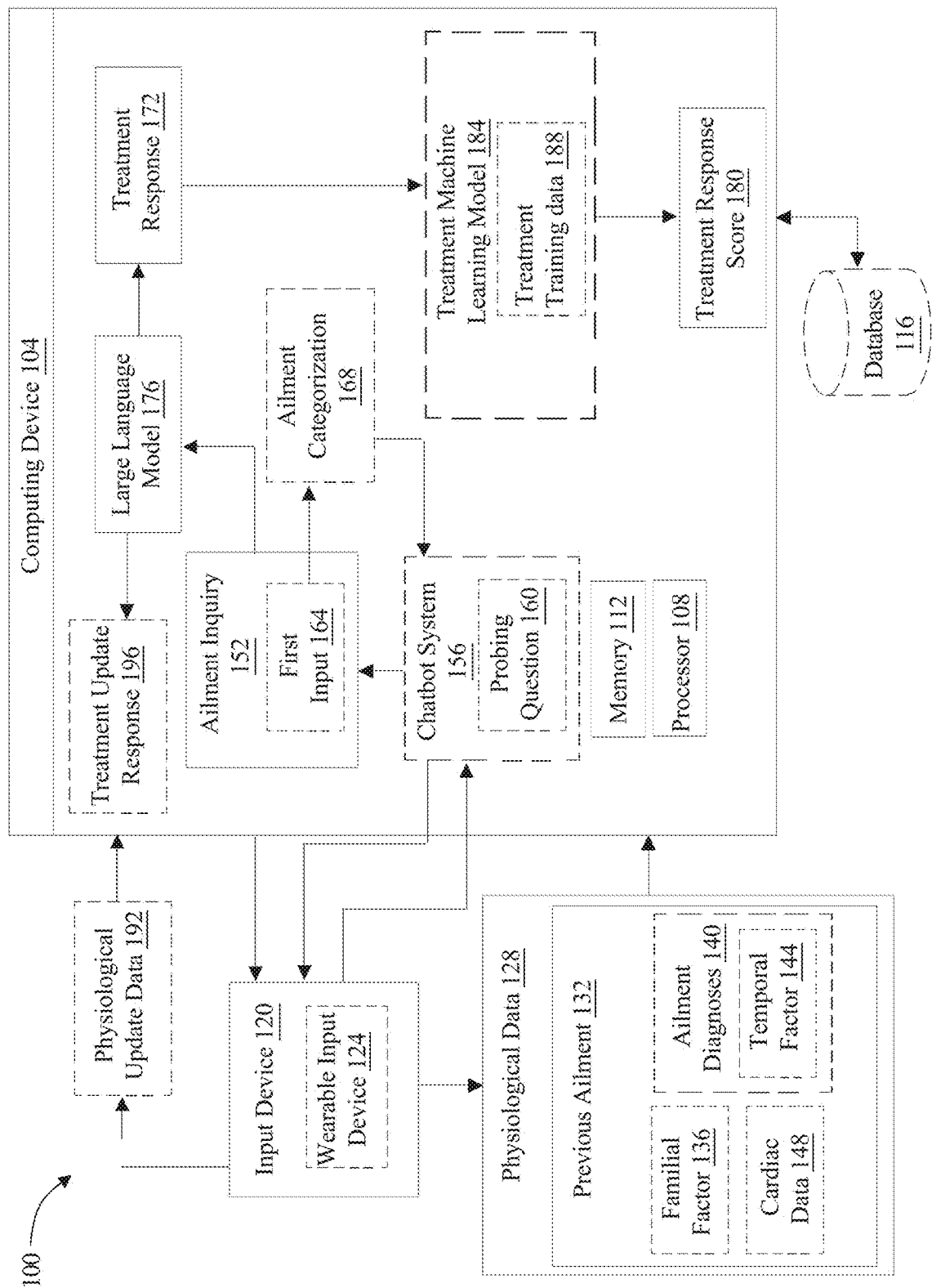
FIG. 1 is an exemplary embodiment of a system for personalized treatment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for personalized treatment. In an aspects, embodiments of the present disclosure include the use of large language models, the use of machine learning models, the use of input devices to receive physiological data and generation of treatment options.

Aspects of the present disclosure can be used to generate treatment options that are specific to the user based on their physiological data Aspects of the present disclosure can also be used to modify outputs of machine learning models and large language models based on the effectiveness of the treatments received. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to signifi-cant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, a system 100 for personalized treatment is described. In one or more embodiments, system 100 may be configured to predict any medical condition and/or medical disease. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit," for the purposes of this disclosure, is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, system 100 may include an input device 120. An "input device," for the purposes of this disclosure, is any device or system capable of transmitting information to computing device 104. For example and without limitation, input device 120 may include a keyboard, a mouse, a smartphone, a laptop a desktop computer, a computing system separate and distinct from that of computing device 104 and the like. In one or more embodiments, input device 120 may include a device that is remote from computing device 104. In one or more embodiments, computing device 104 may operate on a cloud network, server and the like, wherein information may be transmitted wirelessly from input device 120 to computing device 104.

With continued reference to FIG. 1, input device 120 may include a wearable input device 124. "Wearable input device," for the purposes of this disclosure, includes any input device 120 capable of being worn by an individual. For example and without limitation, wearable input device 124 may include a smartwatch, smart glasses, a pair of virtual reality goggles and the like. In one or more embodiments, wearable input device 124 may be capable of recording various physiological traits of a user. For example, and without limitation, wearable input device 124 may be capable of receiving blood oxygen levels associated with a user. A "user," for the purposes of this disclosure, refers to an individual interacting with system 100. For example, and without limitation, user may include an individual seeking medical treatment, A medical patient and/or any other individuals seeking to interact with system 100. In one or more embodiments, wearable input device 124 may be capable of recording physiological traits of a user, such as but not limited to, heart rate, internal body temperature, blood pressure, blood oxygen level, and the like. In one or more embodiments, wearable input device may include a heart rate sensors, an electrocardiogram sensors, accelerometers, a gyroscope, a GPS, A blood oxygen sensor and/or the like.

With continued reference to FIG. 1, computing device 104 and/or processor 108 is configured to retrieve physiological data 128 associated with a user. "Physiological data," for the purposes of this disclosure, is any information associated with the health of an individual. For example, and without limitation, physiological data 128 may include the height of an individual, the weight of an individual, current medications being take and the like. In one or more embodiments, physiological data 128 may include previous medical history of an individual, such as but not limited to, previous diagnoses, previous medications taken, previous medications given, current diagnoses, upcoming medical treatments and the like. In one or more embodiments, physiological data 128 may include any information that may be contained within an electronic health record and/or a medical record associated with an individual. In one or more embodiments, physiological data 128 comprises a previous ailment 132. "Previous ailment," for the purposes of this disclosure, refers to a medical condition that has been previously diagnosed. For example, and without limitation, previous ailment 132 may include a previous cancer diagnoses, a previous high blood pressure diagnoses, a previous diabetes diagnosis and the like. In one or more embodiments, previous ailment 132 may be associated with user, wherein previous ailment 132 includes a diagnoses given onto user. A "Medical condition" for the purposes of this disclosure refers to an illness, disease or disorder that affects the health of an individual. For example, and without limitation, medical condition may include diabetes, high blood pressure and the like. In one or more embodiments, previous ailment 132 may include a diagnoses given onto a family member associated with user. In one or more embodiments, previous ailment 132 may include a hereditary factor 136. A "hereditary factor," for the purposes of this disclosure, refers to a diagnoses given to or medical test results for a family member associated with user. For example, and without limitation, hereditary factor 136 may include information indicating that a blood relative associated with user was previously diagnoses with pancreatic cancer, was previously diagnoses with diabetes, has a history of GERD and the like. In one or more embodiments, hereditary factor 136 may include diagnoses that can be genetically inherited by user. In one or more embodiments, hereditary factor 136 may include any genetic mutations that may be attributed to a potential future medical diagnoses. In one or more embodiments, previous ailment 132 may include, but is not limited to, a cold an individual had, a bacterial infection, a cancer diagnosis and/or any other medical condition that that would require medical treatment or medical intervention. In one or more embodiments, previous ailment 132 includes one or more ailment diagnosis 140. An "ailment diagnosis," for the purposes of this disclosure, refers to a medical diagnoses given specifically to user. For example, and without limitation, ailment diagnosis 140 may include a diagnosis of diabetes given to the user. In another nonlimiting example, ailment diagnosis 140 may include a previous cancer diagnosis given to user. In contrast to hereditary factor 136, in one or more embodiments, ailment diagnosis 140 may include a medical diagnosis given specifically to user. In one or more embodiments, ailment diagnosis 140 may include an associated temporal element 144. A "Temporal element" for the purposes of this disclosure refers to information associated with a date and time. An "Associated temporal element," for the purposes of this disclosure, refers to information associated with the date and time in which a medical condition was diagnosed. For example, and without limitation, ailment diagnosis 140 may include diabetes wherein associated temporal element 144 may include a date of Jul. 6, 2002, as to which the diagnosis was made. In one or more embodiments, each ailment diagnosis 140 may include a date as to which the diagnosis was made.

With continued reference to FIG. 1, physiological data 128 may include cardiac data 148. "Cardiac data," for the purposes of this disclosure, is information associated with a user's heart activity. For example, and without limitation, cardiac data 148 may include a current heart rate, a previous heart rate, a current blood oxygen level, a previous blood oxygen level, a current blood pressure, a previous blood pressure and the like. In one or more embodiments, cardiac data 148 may include any information associated with the heart of a user. In one or more embodiments, cardiac data 148 may be received from wearable input device 124. In one or more embodiment wearable input device 124 may include a smartwatch capable of recording and/or receiving cardiac data 148. In one or more embodiments, wearable input device 124 may iteratively and/or continuously receive cardiac data 148. For example, and without limitation, wearable input device 124 may receive cardiac data 148, every hours, once a day, at predetermined time frames and the like.

With continued reference to FIG. 1, physiological data 128 may be received by one or more input devices 120. In one or more embodiments, names, addresses, previous diagnoses and the like may be received from a first input 164 device 120 such as a smartphone, desktop computer and the like. In one or more embodiments, physiological data 128 such as cardiac data 148 may be iteratively received from wearable input device 124. In one or more embodiments, physiological data 128 may be continuously modified to include additional formation such as cardiac data 148, newly diagnosed medical conditions, newly prescribed medications, newly prescribed medical treatment and the like. In one or more embodiments, physiological data 128 may include an electronic health record associated with a user wherein the electronic health record may be continuously updated to reflect the user's current medical state. In one or more embodiments, information such as cardiac data 148 may be received from separate input devices 120 such as wearable input devices 120. In one or more embodiments, an initial set of data may be received on a first iteration of system 100, wherein additional information may be appended to and/or added to physiological data 128 in order to reflect the current medical state of user. In one or more embodiments, input device 120 may include database 116. In one or more embodiments, physiological data 128 may be received from database 116.

With continued reference to FIG. 1, physiological data 128 may include geographical data. "Geographical data," for the purposes of this disclosure, refers to the physical location of user. For example, and without limitation, geographical data may include information indicating that a user currently resides in Los Angeles, California. In one or more embodiments, geographical data may include, but is not limited to, places of residence, previous geographical locations visited and the like. In one or more embodiments, geographical data may include information indicating that a user has traveled to another state, another country, another continent and the like. In one or more embodiments, input device 120 may contain one or more sensors configured to identify the location of user. In one or more embodiments, input device 120 may record an individual's location wherein the location may be received as geographical data.

With continued reference to FIG. 1, processor 108 is configured to receive an ailment inquiry 152 from user. An "ailment inquiry," for the purposes of this disclosure, refers to a request by the user to seek a medical diagnosis. For example, and without limitation, a user may input a request to identify the cause of a headache, the cause of chest pain, the cause of a cough and the like. In one or more embodiments, ailment inquiry 152 may include any information received by user for the purposes of receiving a medical diagnosis and/or a determination as to whether a medical condition may exist. In one or more embodiments, ailment inquiry 152 may include statement such as but not limited to "My head hurts," "I have chest pain," "I feel cold," and the like. In one or more embodiments, ailment inquiry 152 may include a current symptom the user is feeling. In one or more embodiments, ailment inquiry 152 may include a question in which the user is seeking to receive information. For example, and without limitation, ailment inquiry 152 may include a questions, such as "why do I have chest pain?" or "do I have an infection?". In one or more embodiments, ailment inquiry 152 may be received by input device 120, such as a desktop computer, a laptop, a smartphone and the like.

With continued reference to FIG. 1, ailment inquiry 152 may be received by a chatbot system 156. A "chatbot system," for the purposes of this disclosure, is a program configured to simulate human interaction with a user or a provider in order to receive or convey information. In some cases, chatbot system 156 may be configured to receive ailment inquiry 152 as an input and/or elements thereof through interactive questions and/or probing questions 160 presented to the user. The questions may include, but are not limited to, questions such as "Please describe your symptoms," "Do you have chest pain," "when did your coughing begin" and the like. In some cases, computing device 104 may be configured to present a comment box through a user interface wherein a user may interact with the chatbot and answer the questions through input into the chat box. In some cases, questions may require selection of one or more pre-configured answers. For example, chatbot system 156 may ask an individual to describe their symptoms wherein the user may select the appropriate symptoms from a list of pre-configured answers. In situations where answers are limited to limited responses, chatbot may be configured to display checkboxes wherein a user may select a box that is most associated with their answer. In one or more embodiments, chatbot system 156 may be configured to ask probing question 160 in order to determine what the underlying medical condition may be. In one or more embodiments, responses to the probing questions 160 may result in more narrow questions until a desired response is received. A "probing question," for the purposes of this disclosure, is a question designed to elicit more detailed information from a respondent. For example, and without limitation, a probing question 160 may include "when did your symptoms begin?" wherein the probing question 160 may be designed to determine the start of a particular symptom associated with an ailment inquiry 152. In one or more embodiments, probing questions 160 may include a broad question of a particular area wherein the broad question may be narrowed as particular responses are received. For example, and without limitation, chatbot system 156 may be configured to ask, "do you currently have a cough?" wherein a response of "yes" may result in a follow up question of "Is the cough a wet cough or dry cough" whereas a response of "no" may cease additional questions associated with a cough. In one or more embodiments, probing questions 160 may be used to receive more information about a particular ailment inquiry 152. In one or more embodiments, chatbot system 156 may be configured to ask probing questions 160 based on responses given by the user. For example, and without limitation, chatbot system 156 may ask more detailed questions relating to chest pain based on information within ailment inquiry 152 indicating chest pain. In one or more embodiments, probing questions 160 may be used to determine or narrow down medical conditions associated with ailment inquiry 152. For example, and without limitation, the presence of a wet cough may be indicative of one medical condition, the presence of a dry cough may be indicative of another medical condition, and lack of a cough may be indicative of another medical condition as well. In one or more embodiments, computing device 104 and/or chatbot system 156 may use a decision tree and/or question tree in order to determine which probing questions 160 to ask user. In one or more embodiments, prompts by chatbot system 156 may begin with initial questions, and follow up questions for each specific answer. In one or more embodiments, decision trees may be used to narrow down medical diagnoses based on responses given by a user. In one or more embodiments, a decision tree may be located on database 116, wherein the decision tree may contain a plurality of probing questions 160, wherein each set of probing questions 160 may be asked based on a particular response given by user. In one or more embodiments, chatbot system 156 may utilize decision tree in order to ask specific questions based on user responses. In one or more embodiments, chatbot system 156 may utilize decision tree in order to ask to follow up question in instances in which information is missing and/or a response was inadequate. In one or more embodiments, as the conversation between chatbot system 156 and a user progress, the decision tree may aid in the determination of what information may be needed. In one or more embodiments, chatbot system 156 may evaluate already received information and determine what information may be missing. In one or more embodiments, decision tree may be used to gather missing information. In one or more embodiments, chatbot system 156 may make an initial determination as to a user's health and utilize decision tree in order to confirm the medical condition. For example and without limitation, responses made by a user may indicate that the user has diabetes wherein chatbot system 156 may be configured to ask questions specific to diabetes in order to determine if the user has diabetes. In one or more embodiments, a particular set of information may be needed in order to make a diagnosis wherein chatbot system 156 may be configured to retrieve any missing information needed to make the diagnosis. In one or more embodiments, depending on responses to chatbot system 156 chatbot system 156 can tailor questions and responses to the user's specific condition or needs.

With continued reference to FIG. 1, chatbot system 156 may be configured to present probing questions 160 through a user device. In one or more embodiments, user device may be consistent with input device 120. In one or more embodiments, user device may include a device separate and/or distinct from input device 120. In one or more embodiments, user device may include a smartphone, desktop computer and/or any other computing device 104. In one or more embodiments, all responses made to chatbot system 156 may be stored and/or received as ailment inquiry 152.

With continued reference to FIG. 1, ailment inquiry 152 may include multiple inputs and/or a series of inputs made by user. For example and without limitation, ailment inquiry 152 may include an initial input and/or statement made by user and a follow up statement made by user following request for additional information by chatbot system 156 and/or computing device 104. In one or more embodiments, ailment inquiry 152 may include a first input 164 by user. A "first input," for the purposes of this disclosure, refers to an initial input made by a user in order to request information pertaining to a medical diagnosis. For example, and without limitation, initial input may include, but is not limited to, "Why do I have a headache," "Why does my chest hurt" and the like. In one or more embodiments, first input 164 includes information received by user for the purpose of receiving a determination about their health. In one or more embodiments, ailment inquiry 152 may include multiple inputs wherein an initial input may include first input 164. In one or more embodiment subsequent inputs following first input 164 may include information from user clarifying symptoms and the like. In one or more embodiments, initial input may prompt chatbot system 156 to request subsequent inputs which may be received as ailment inquiry 152.

With continued reference to FIG. 1, first input 164 may be classified and/or categorized to one or more ailment categorizations 168. An "Ailment categorization," for the purposes of this disclosure, is a grouping of medical conditions having similar symptoms. For example, and without limitation, ailment categorization 168 may include "Cough" wherein medical conditions having cough as a symptom, such as common cold, asthma, chronic bronchitis tuberculosis and the like may all be grouped together. In one or more embodiments, ailment categorizations 168 may include symptoms wherein each grouping may contain medical conditions associated with the symptom in which they are grouped in. In one or more embodiments an ailment categorization 168 with "shortness of breath" may include a grouping of medical conditions such as asthma, chronic obstructive pulmonary disease, pulmonary embolism, heart failure and the like. In another non limiting example, an ailment categorization 168 of abdominal pain may include a grouping od medical conditions such as appendicitis, gallstones, irritable bowel syndrome and the like. In one or more embodiments, ailment categorizations 168 may include symptoms such as headache, seizures, chest pain, palpitations, joint pain, muscle weakness, rash, itching, depression, anxiety, fatigue, excessive thirst, anemia, painful urination and the like. In one or more embodiments, each ailment categorization 168 may include one or more medical conditions. In one or more embodiments, a particular medical condition may be present in multiple ailment categorizations 168. In one or more embodiments, first input 164 may be categorized and/or classified to one or more ailment categorizations 168. In one or more embodiments, each ailment categorization 168 may contain associated keywords and/or phrases wherein computing device 104 and/or chatbot system 156 may identify keywords and/or phrases within first input 164 and classify them to a particular ailment categorization 168/For example, and without limitation, the phrase "My head hurts" may contain keywords such as "head" and "hurt" which may be associated with an ailment categorization 168 of headaches. In one or more embodiments, each ailment categorization 168 may contain one or more keywords and/or phrases that may be used to classify first input 164 to one or more ailment categorizations 168. In one or more embodiments, each ailment categorization 168 may contain its own set of probing questions 160 in order to narrow down a particular medical condition within the ailment categorization 168. For example, and without limitation, ailment categorization 168 of shortness of breath may contain probing questions 160 in order to narrow down whether an individual may be suffering from asthma or heart failure.

With continued reference to FIG. 1, computing device 104 and/or chatbot system 156 may use a classifier to classify ailment inquiry 152 and/or first input 164 to one or more ailment categorizations 168. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. For example, Processor 108 may generate and train an ailment classifier configured to receive ailment inquiry 152 and/or first input 164 and output at least an ailment categorization 168. Processor 108 and/or another device may generate a classifier using a classification algorithm, defined as a process whereby processor 108 derives a classifier from training data. In some cases confidence classifier may use data to prioritize the order in of labels within ailment inquiry 152. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. An ailment classifier may be trained with training data correlating ailment inquiries 152 to ailment categorizations 168, such as, cough, shortness of breath and the like. Training data may be received from an external computing device 104, user input, and/or previous iterations of processing. An ailment classifier may be configured to receive ailment inquiry 152 and categorize components of ailment inquiry 152 to one or more ailment categorizations 168.

With continued reference to FIG. 1, processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 108 may be configured to ask one or more probing questions 160 as a result of the classification. In one or more embodiments, probing questions 160 may be used to narrow down the possibilities as to a particular medication. In one or more embodiments, probing questions 160 may be used to clarify symptoms, receive more detailed information and the like. In one or more embodiments, database 116 may be populated with a plurality of probing questions 160 wherein each set of probing questions 160 may be classified to an ailment categorization 168. In one or more embodiments, classification of first input 164 to one or more ailment categorizations 168 may result in selection of one or more probing questions 160 to ask user.

With continued reference to FIG. 1, computing device 104 is configured to generate treatment response 172. A "treatment response," for the purposes of this disclosure, is information indicating a diagnosis of a medical condition and a treatment for the diagnosis. For example, and without limitation, treatment response 172 may indicate that the user likely suffers from a bacterial information and that the treatment involves the use of antibiotics. Similarly, treatment response 172 may include information indicating that a user suffers from asthma and that the treatment required would be an asthma inhaler. In one or more embodiments, treatment response 172 may include a diagnosed medical condition as a result of ailment inquiry 152 and a suggested treatment for the medical condition. In one or more embodiments, treatment response 172 may include treatments such as medications, herbal remedies and/or lifestyle modifications. For example, and without limitation, treatment response 172 may indicate that an individual has a common cold, and that the treatment should be drinking hot tea or fluids. In one or more embodiments, treatment response 172 may indicate to a user to reduce sugar intake. In one or more embodiments, treatment response 172 may include a likelihood that the patient suffers from a particular medical condition and various lifestyle choices that the user can implement to improve their health. In one or more embodiments, lifestyle choices may include options to lose weight, reduce caloric intake, increase cardiovascular activity, increase exposure to sunlight, decrease exposure to sunlight and the like. In one or more embodiments, treatment response 172 may include information that may aid and/or treat a particular medical condition. In one or more embodiments, treatment response 172 may include herbal remedies, such as *eucalyptus*, tea, various natural foods and/or plants and the like.

With continued reference to FIG. 1, treatment response 172 may include products manufactured, sold, and/or distributed by an individual managing system 100. In one or more embodiments, treatment responses 172 may include affiliate link products. "Affiliate link products," as described herein are products or services that an individual or entity may promote in exchange for a commission on each sale. In one or more embodiments, treatment responses may include affiliate link products, such as for example, a particular store brand of vitamins, a generic brand for a medication, and the like. In one or more embodiments, treatment responses 172 may include vitamins, medications and the like that may be purchased from differing entities. In one or more embodiments, treatment response 172 may include products that are promoted by a user associated with system 100. In one or more embodiments, a user such as an entity may engage in a contractual relationship with various nutrition and/or medication providers and promote products from providers in which a treatment response may be purchased.

In one or more embodiments, treatment response 172 may be generated using a large language model. In one or more embodiments, ailment inquiry 152 and/or physiological data 128 may be input into the large language model wherein the large language model may output one or more treatment responses 172. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, and the like. In some embodiments, training sets of LLM 176 may include information from one or more public or private databases 116. As a non-limiting example, training sets may include databases 116 associated with an entity. In an embodiment, LLM 176 may include one or more architectures based on capability requirements of LLM 176. Exemplary architectures may include, without limitation, GPT (Generative Pretrained Transformer), BERT (Bi-directional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, LLM 176 may be generally trained. As used in this disclosure, a "generally trained" LLM 176 is LLM 176 that is trained on a general training set comprising a variety of subject matters, data sets, and fields. In some embodiments, LLM 176 may be initially generally trained. Additionally, or alternatively, LLM 176 may be specifically trained. As used in this disclosure, a "specifically trained" LLM 176 is LLM 176 that is trained on a specific training set, wherein the specific training set includes data including specific correlations for the LLM 176 to learn. As a non-limiting example, LLM 176 may be generally trained on a general training set, then specifically trained on a specific training set. In an embodiment, specific training of LLM 176 may be performed using a supervised machine learning process. In some embodiments, generally training LLM 176 may be performed using an unsupervised machine learning process. As a non-limiting example, specific training set may include information from a database 116. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as LLM 176 may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as LLM 176 may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments LLM 176 may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. LLM 176 may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. LLM 176 may output such predictions by ranking words by likelihood or a prompt parameter. For the example given above, LLM 176 may score "you" as the most likely, "your" as the next most likely, "his" or "her" next, and the like. LLM 176 may include an encoder component and a decoder component.

Still referring to FIG. 1, LLM 176 may include a transformer architecture. In some embodiments, encoder component of LLM 176 may include transformer architecture. A "transformer architecture," for the purposes of this disclosure, is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM 176 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 176 may predict the next word by searching for a set of positions in a source sentence where the most relevant information is concentrated. LLM 176 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to LLM 176, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 176 may pick up particular parts at different positions in the input sequence and over time compute an initial composition of the output sequence. In multi-head attention, LLM 176 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 176 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM 176 may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 176 may either attend to all source words or predict the target sentence, thereby attending to a smaller subset of words.

With continued reference to FIG. 1, multi-headed attention in encoder may apply a specific attention mechanism called self-attention. Self-attention allows models such as LLM 176 or components thereof to associate each word in the input, to other words. As a non-limiting example, LLM 176 may learn to associate the word "you", with "how" and "are". It's also possible that LLM 176 learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens".

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow LLM 176 to learn to extract and focus on different combinations of attention from its attention heads.

With continued reference to FIG. 1, LLM 176 may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device 104 that is used by a user. As non-limiting examples, user device may include desktops, laptops, smartphones, tablets, and the like. In some embodiments, input may include any set of data associated with physiological data 128 and/or ailment inquiry 152 whereas outputs may include one or more treatment responses 172.

With continued reference to FIG. 1, LLM 176 may generate at least one annotation as an output. At least one annotation may be any annotation as described herein. In some embodiments, LLM 176 may include multiple sets of transformer architecture as described above. Output may include a textual output. A "textual output," for the purposes of this disclosure, is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, LLM 176 may include and/or be included in chatbot system 156. In one or more embodiments, chatbot system 156 may be powered by LLM 176 wherein probing questions 160, follow up questions and the like may be generated by LLM 176. In one or more embodiments, chatbot system 156 may receive first input 164 wherein first input 164 may be fed into LLM 176 and a set of probing questions 160 may be generated and asked to user. In one or more embodiments, chatbot system 156 may be powered by LLM 176 wherein LLM may receive responses and provide outputs through chatbot system 156. As described in this disclosure, the term "powered by LLM" indicates that inputs and outputs are received and generated by LLM. For example, and without limitation, inputs received by chatbot system 156 are fed into LLM wherein outputs of LLM 176 are transmitted through chatbot system 156 and to a user.

With continued reference to FIG. 1, LLM 176 may receive inputs such as ailment inquiry 152 and/or physiological data 128 and output one or more treatment responses 172. In one or more embodiments, LLM 176 may use pattern recognition to recognize patterns between potential symptoms within ailment inquiry 152 and potential diagnosis within treatment response 172. For example, and without limitation, a combination of fever, cough and difficult breathing may be indicative of a particular respiratory disease. In one or more embodiments, LLM 176 may use contextual information such as physiological data 128 to distinguish between various medical conditions. For example, and without limitation, the age of an individual, the weight of the individual and the like may be determinative of a particular medical condition. In one or more embodiments, LLM 176 may use probability estimation to determine for frequently symptoms are associated with a particular medical condition such that diagnoses are made from said probabilities. In one or more embodiments, LLM 176 may use data such as previous ailment 132 in order to determine the likelihood that the user has a medical condition associated with previous ailment 132. For example, and without limitation, a hereditary factor 136 of diabetes may increase the probability that the patient may be suffering from diabetes. Similarly, a previous chest infection may increase the probability of pneumonia. In one or more embodiments, an individual's physiological data 128 may increase the probability that the user is suffering from a particular medical condition. In one or more embodiments, lab reports, heart function, blood oxygen levels and the like may be used to increase the accuracy of a particular medical diagnosis.

With continued reference to FIG. 1, LLM 176 may be configured to receive ailment inquiry 152 and one or more treatment responses 172. In one or more embodiments, treatment responses 172 may include multiple differing medical diagnoses, multiple differing treatment plans and the like. In an embodiments, ailment inquiry 152 may be used to ascertain the medical condition that a user is suffering from while physiological data 128 may be used to determine which treatment option may best be suited for the user. In one or more embodiments, LLM 176 may receive ailment inquiry 152 and/or physiological data 128 and output one or more treatment responses 172.

With continued reference to FIG. 1, computing device 104 is configured to score each of one or more treatment responses 172. In one or more embodiments, multiple treatment responses 172 may be generated wherein computing device 104 may score each treatment response 172. For the purposes of this disclosure "scoring a treatment response" and/or the processing of scoring treatment responses 172 refers to a process of determining a compatibility of a particular treatment response 172 to the user. For example, and without limitation, treatment responses 172 may be scored wherein treatment response 172 with a higher score may indicate a high likelihood that the patients suffers from a particular medical condition and/or a high likelihood that a particular treatment plan is suitable for the user whereas a low likelihood may indicate the opposite. In one or more embodiments, a scored treatment response may be referred to as a treatment response scores 180. In one or more embodiments, treatment response score 180 may include a treatment response 172 that has been scored, ranked and/or given a numerical rating. In one or more embodiments, scoring may be numerical wherein a higher numerical score may indicate a higher likelihood that a treatment is suitable for user. In one or more embodiments, treatment responses 172 may be scored relative to one another wherein a particular treatment response 172 may be scored and/or ranked relative to other treatment responses 172. In one or more embodiments, scoring treatment responses 172 may indicate that a particular treatment response 172 may be more suitable for user. In one or more embodiments, scoring treatment response 172 may indicate which treatment responses 172 have a higher likelihood of containing the correct diagnosis and/or the correct treatment plan for a particular individual.

With continued reference to FIG. 1, LLM 176 may be configured to score one or more treatment responses 172. In an embodiments, LLM 176 may be configured to receive ailment inquiry 152 as an input and output one or more treatment responses 172. In one or more embodiments, LLM 176 may be configured to receive one or more treatment responses 172 and physiological data 128 and output scores for each treatment response 172. In one or more embodiments, scores may be based on hereditary factors 136 wherein diagnoses similar to that within hereditary factors 136 may indicate a higher likelihood of a particular medical condition. In a non-limiting example, LLM 176 may score a treatment response 172 indicating diabetes as the medical condition for an individual with a history of diabetes. In one or more embodiments, previous ailments 132, ailment diagnosis 140 and/or and temporal elements 144 may be used to determine the likelihood of a particular medical condition. For example, and without limitation, an individual suffering from a cold two weeks prior may have a higher likelihood of having pneumonia as the cough from the cold may have gotten worse. In one or more embodiments, physiological data 128 may further be used to score treatment responses 172. For example and without limitation, an individual with a particular heart rate or blood pressure may be suffering from a particular medical condition. In one or more embodiments, ailment inquiry 152 may be used to generate one or more treatment responses 172 while physiological data 128 may be used to score treatment responses 172 and select the highest scoring treatment response 172. In one or more embodiments, physiological data 128 may indicate that a patient may not respond well to a particular treatment plan wherein treatment responses 172 may be scored accordingly. In one or more embodiments, a treatment plan, such as running, or exercise may be difficult for an individual incapable of walking as indicated by physiological data 128. In one or more embodiment, physiological data 128 may be used to narrow down possible medical conditions. For example and without limitation, an individual with X-Y chromosomes may be less likely to have breast cancer, while an individual with Y-Y chromosomes may be less likely to have testicular cancer. In one or more embodiments, physiological data 128 may be used to narrow down particular medical conditions and/or to determine a treatment plan that is best suited to user. In one or more embodiments, physiological data 128 may include current treatments being taken by a user, wherein LLM 176 may be configured to score treatment responses 172 based on their computability with existing treatments and/or medications. In one or more embodiments, geographical data may indicate that an individual recently traveled to a country known for a particular disease, wherein treatment responses 172 may be rated based on the user's previous location. In one or more embodiments, the presence of various biomarkers in an individual's lab results may indicate a particular treatment response 172. In one or more embodiments, an individuals heart rate, blood oxygen level and the like may be determinative of the type of treatment plan that may be best suited to the user. In one or more embodiments, physiological data 128 may be used to determine the relevance of a particular treatment response 172. In one or more embodiments, LLM 176 may receive ailment inquiry 152 simultaneously and output a treatment response 172. In one or more embodiments, LLM 176 may generate a score for each treatment response 172 generated wherein computing device 104 may select the treatment response 172 with the highest scoring.

With continued reference to FIG. 1, treatment responses 172 may be scored based on ailment diagnosis 140 and associated temporal elements 144. In an embodiment, the closer in time a particular diagnoses was recently given the higher the likelihood of a particular medical condition. For example, and without limitation, an individual suffering from an infection may soon suffer from pneumonia. In one or more embodiments, various medical conditions may cause future medical issues. For example, and without limitation, an individual diagnosed with diabetes may have a higher likelihood of heart and blood vessel disease wherein a treatment response 172 associated with heart and blood vessel disease may have a higher likelihood. In one or more embodiments, scoring treatment responses 172 may include scoring treatment responses 172 as a function of previous ailments 132 and associated temporal elements 144. In one or more embodiments, it may be the case that an individual suffered from a cold about a year or two prior to input of ailment inquiry 152 wherein the cold may not contribute to any future medical conditions. In one or more embodiments, temporal elements 144 may indicate the likelihood that a current medical condition and previously diagnosed medical condition are related. For example, a previous diagnoses of cancer 6 months prior may indicate a higher likelihood of cancer diagnosis in the future whereas a previous cancer diagnosis several years prior may indicate a lower likelihood.

In one or more embodiments, treatment responses 172 may be scored as a function of a machine learning model. In one or more embodiments, computing device 104 may include a machine learning module to implement one or more algorithms or generate one or more machine-learning models to generate outputs. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, user inputs and/or be provided by a user. In other embodiments, a machine-learning module may obtain a training set by querying a communicatively connected database 116 that includes past inputs and outputs. Training data may include inputs from various types of databases 116, resources, libraries, dependencies and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module may be used to create a machine learning model and/or any other machine learning model using training data. Training data may be data sets that have already been converted from raw data whether manually, by machine, or any other method. In some cases, the machine learning model may be trained based on user input. For example, a user may indicate that information that has been output is inaccurate wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database 116, and/or be provided by a user. In other embodiments, machine-learning module may obtain a training set by querying a communicatively connected database 116 that includes past inputs and outputs. Training data may include inputs from various types of databases 116, resources, libraries, dependencies and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. In one or more embodiments, A machine learning model such as treatment machine learning model 184 may include a machine learning model configured to receive inputs such as treatment responses 172 and/or physiological data 128 and output one or more scores for treatment responses 172. In one or more embodiments, treatment machine learning model 184 may be configured to receive physiological data 128 and treatment responses 172 as an input and output treatment responses 172 most closely related to user based on physiological data 128.

With continued reference to FIG. 1, treatment machine learning model 184 may be trained with treatment training data 188. In an embodiment, treatment training data 188 includes a plurality of physiological data 128 correlated to a plurality of treatment responses 172. In yet another embodiments, treatment training data 188 includes a plurality of physiological data 128 and treatment responses 172 correlated to a plurality of scored treatment responses 172. In one or more embodiments, a particular physiological data 128 and set of treatment responses 172 may contain a set of scored treatment responses 172. In one or more embodiments, treatment responses 172 may be scored based on current medications the user is taking, previous treatments, previous locations, gender, age and the like. In one or more embodiments, treatment machine learning model 184 may be trained with treatment training data 188. In one or more embodiments, treatment responses 172 may be scored as a function of treatment machine learning model 184. In one or more embodiments, treatment machine learning model 184 may be configured to receive physiological data 128 and output treatment responses 172. In one or more embodiments, computing device 104 may determine which treatment responses 172 generated by treatment machine learning model 184 and which treatment responses 172 generated By LLM 176 wherein treatment responses 172 may be generated based on similarity. In one or more embodiments, treatment machine learning model 184 may be configured to receive physiological data 128 and/or one or more treatment responses 172 and score treatment responses 172 based on their association to user data. In one or more embodiments, treatment machine learning model 184 may be iteratively trained through user input. In one or more embodiments, user may input if a treatment was correct, suitable and/or provided adequate treatment. In one or more embodiments, treatment machine learning model 184 may be iteratively trained based on user input wherein user's may indicate how effective a particular treatment response 172 was.

With continued reference to FIG. 1, processor 108 may be configured to iteratively receive physiological update data 192 from input device 120. In one or more embodiments, following generation and/or selection of treatment responses 172, processor 108 may be configured to iteratively receive physiological update data 192. "Physiological update data," for the purposes of this disclosure, is physiological data 128 that is received following generation or selection of treatment response 172. For example, and without limitation, physiological update data 192 may include a heart rate, blood oxygen levels and the like. In one or more embodiments, physiological update data 192 may be used to determine the effectiveness of treatment response 172. In one or more embodiments, changes to physiological update data 192 in comparison to physiological data 128 may indicate that treatment response 172 has affected user. In one or more embodiments, physiological update data 192 may include information such as blood oxygen levels, body temperature, heart rate, blood pressure and the like. In one or more embodiments, physiological update data 192 may include lab results following implementation of treatment response 172, medical visits by a physician and the like. In one or more embodiments, physiological update data 192 may include any information within physiological data 128 wherein elements within physiological update data 192 may be compared to elements within physiological data 128 in order to determine the effectiveness of treatment response 172. In one or more embodiments, physiological update data 192 may be used to determine if an additional or alternative treatment response 172 is needed. In one or more embodiments, negative changes between physiological update data 192 and physiological data 128 may indicate an alternate treatment response 172 is needed. In one or more embodiments, increases blood pressure, increased to body temperature and the like may indicate that a treatment response 172 has not been effective. In one or more embodiments, changes in lab results and/or urine results may indicate positive or negative changes to a user's health. In one or more embodiments, physiological update data 192 may be fed into LLM 176 wherein LLM 176 may generate one or more treatment update responses 196. A "treatment update response" for the purpose of this disclosure is a treatment response 172 generated in response to receipt of physiological update data 192. For example, and without limitation, LLM 176 may receive physiological update data 192, determine that a treatment response 172 has not been effective in comparison to physiological date and generate treatment update response 196. In one or more embodiments, physiological update data 192 may indicate positive changes in which various portions of treatment response 172 may no longer be needed. For example, and without limitation, physiological update data 192 may indicate that an individuals cholesterol is no longer an issue wherein treatments within treatment response 172 in association with high cholesterol may be removed in treatment update response 196.

With continued reference to FIG. 1, processor 108 may be configured to iteratively receive physiological update data 192, such as for example, once a day, once a week, once a month and the like. In one or more embodiments, processor 108 may be configured to iteratively generate treatment update responses 196 as a function of physiological update data 192. In one or more embodiments, physiological update data 192 may be used to train and/or modify outputs of LLM 176 and/or treatment machine learning model 184. In one or more embodiments, LLM 176 may be configured to generate possible treatment responses 172 whereas treatment machine learning model 184 may be configured to determine the best treatment response 172 for user. In one or more embodiments, physiological update data 192 may be used to train treatment machine learning model 184 wherein feedback may be given on the effectiveness of treatment responses 172. In one or more embodiments, treatment machine learning model 184 may be iteratively trained based on feedback given by users and/or contained within physiological update data 192.

With continued reference to FIG. 1, processor 108 may be configured to iteratively transmit treatment response 172 to user through user device and/or input device 120. In one or more embodiments, treatment response 172 may include reminders, notification and the like that may be transmitted to input device 120 and/or user device. In one or more embodiments, treatment responses 172 may be transmitted as text messages to a user's phone. In one or more embodiments, computing device 104 may require a response to text messages to confirm receipt of treatment response 172. In one or more embodiments, treatment responses 172 may be broken up into steps wherein each step may be transmitted in a separate text message. In one or more embodiments, treatment responses 172 may be transmitted via a cellular network wherein treatment responses 172 may be received as text messages.

With continued reference to FIG. 1, each LLM 176 and/or treatment machine learning model 184 may be configured specifically for each user. In one or more embodiments, training and/or modification of LLM 176 and/or treatment machine learning model 184 may be specific to user. In one or more embodiments, each LLM 176 may contain information specific to a differing user. In one or more embodiments, each LLM 176 may contain physiological data 128 specific to a user wherein physiological data 128 may be modified with physiological update data 192. In one or more embodiments, new lab results, new heart rate recording and the like may be added to physiological data 128. In one or more embodiments, LLM 176 may store interactions of treatment responses 172 with each user for future iterations.

With continued reference to FIG. 1, in one or more embodiments, physiological data 128, physiological update data 192 and/or any information described herein may be encrypted. In one or more embodiments, physiological data 128, physiological update data 192, ailment inquiry 152 (referred to hereafter as "personal data") may be encrypted in order to ensure that information associated with user may not be accessed and/or tampered with by unauthorized individuals. In one or more embodiments, personal data may be stored on user device, wherein personal data may be transmitted to LLM 176 prior to each iteration. In an embodiments, personal data may be stored remote from LLM 176 in order to ensure that personal data is not tampered with. In one or more embodiments, personally identifiable information, such as names, addresses and the like may be removed from personal data in order to ensure that information cannot be traced back to user. In one or more embodiments, personally identifiable information may be stored on user device to ensure security while non-personally identifiable information may be transmitted to LLM 176 and/or treatment machine learning model 184 for processing. In one or more embodiments, personal data may be encrypted and stored on database 116 wherein only user may have access to decryption key. In one or more embodiments, personal data may be encrypted in any way as described in this disclosure. In one or more embodiments, an access log may be used to track individuals who have access personal data. An "access log," for the purposes of this disclosure, is information indicating the individuals or devices that have accessed personal data. In one or more embodiments, access log may include names and IP addresses of individuals who have accessed persona data. In one or more embodiments, access log may include a time stamp indicating the time and day at which personal data was accessed. In one or more embodiments, access log may further include information indicating what action was performed by the individual such as read, write or delete data. In one or more embodiments, access log may be stored on an immutable sequential listing. In one or more embodiments, storing of access log on immutable sequential listing may ensure that access log cannot be tampered with. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered. In one or more embodiments, access logs may contain digital signatures in order to ensure that access logs cannot be tampered with. In one or more embodiments, access logs may be continuously monitored in order to ensure that personal data is not accessed. In one or more embodiments, LLM 176 and user may both contain similar encryption and decryption keys wherein data transmitted to LLM 176 may be decrypted by LLM 176, processed, encrypted, and transmitted back to user device.

In one or more embodiments, a machine learning model such as treatment machine learning model 184 may contain parameter values. "Parameter values," for the purposes of this disclosure, are internal variables that a machine learning model has generated from training data in order to make predictions. In one or more embodiments, parameter values may be adjusted during pretraining or training in order to minimize a loss function. In one or more embodiments, during training, predicted outputs of the machine learning model are compared to actual outputs wherein the discrepancy between predicted output and actual outputs are measured in order to minimize a loss function. A loss function also known an "error function" may measure the difference between predicted outputs and actual outputs in order to improve the performance of the machine learning model. A loss function may quantify the error margin between a predicted output and an actual output wherein the error margin may be sought to be minimized during the training process. The loss function may allow for minimization of discrepancies between predicted outputs and actual outputs of the machine learning model. In one or more embodiments, the loss function may adjust parameter values of the machine learning model. In one or more embodiments, in a linear regression model, parameter values may include coefficients assigned to each feature and the bias term. In one or more embodiments, in a neural network, parameter values may include weights and biases associated with the connection between neurons or nodes within layers of the network. In one or more embodiments, during pretraining and/or training of the machine learning model, parameter values of the machine learning model (e.g. treatment machine learning model 184) may be adjusted as a function of at least one output of the machine learning model. In one or more embodiments, processor 108 may be configured to minimize a loss function by adjusting parameter values of treatment machine learning model 184 based on discrepancies between outputs and feedback associated with said outputs. In one or more embodiments, training treatment machine learning model 184 may include adjusting one or more parameter values of treatment machine learning model 184 based on feedback received, such as physiological update data 192. In one or more embodiments, modifications to parameter values may be encrypted and stored on a remote database 116. In one or more embodiments, each treatment machine learning model 184 may contain modified parameter values based on feedback received from user. In one or more embodiments, modified parameter values may be encrypted and stored on remote server, wherein modified parameter values may be accessed and used once a user instantiates system 100.

In one or more embodiments, LLM 176 may receive a system prompt. "System prompt," for the purposes of this disclosure, is a predefined ser of instructions or context given to a large language model in order to guide responses made by the large language model. For example, and without limitation, system prompt may include physiological data 128 wherein LLM 176 may make responses based on physiological data 128. In one or more embodiments, each user may have an associated system prompt, wherein the system prompt contains information about the user necessary for the LLM 176 to make accurate determinations. In one or more embodiments, system prompts may be continuously modified in order to reflect the user more accurately. For example, and without limitation, physiological update data 192 may be added to system prompts in order to update the user's health, the effect of various treatment responses 172 on user may be recorded in system prompt and the like. In one or more embodiments, in a first iteration of processing of system 100, system prompt may include physiological data 128. In one or more embodiments, in subsequent iterations, system prompt may include physiological update data 192, responses made by user and the like. In one or more embodiments, LLM 176 may be configured to record the dialect of user, the preferred language and the like and record them within system prompt. In one or more embodiments, prior to each processing of LLM 176, LLM 176 may receive system prompt and then receive a request from user such as ailment inquiry 152. In one or more embodiments, system prompt may be encrypted and/or secured on remote database 116. In one or more embodiments, information received by LLM 176 may not be used to train LLM 176. Instead, system prompt may provide instructions for future iterations. In one or more embodiments, system prompt may further include previous treatment responses 172, the user's interaction with previous treatment responses 172 and the like. In an embodiment, system prompt may ensure that any information related to user is not used to train LLM 176 but is rather separate and distinct from LLM 176.

With continued reference to FIG. 1, LLM 176 may include a retrieval-augmented language model (RALM). In one or more embodiments, RALM may include a traditional LLM combined with information retrieval systems in order to enhance performance and reduce factual errors. In one or more embodiments, RALM, may incorporate a retrieval mechanism that retrieves relevant information from a large data set or knowledge base on the context of the input, such as an ailment inquiry. In one or more embodiments, the large dataset or knowledge base may include a database of medical journals, treatment options, research papers and the like. In one or more embodiments, RALM may gather contextually relevant information. In one or more embodiments, RALM may gather information that may not be explicitly present within training data. IN one or more embodiments, by retrieving additional contextual information, RALM may generate responses that are factually correct rather than responses from training data that may be incorrect. In one or more embodiments, RALM may reduce a reliance on pre-existing data within training data of LLM. In one or more embodiments, RALM may retrieve information that may be relevant to treatment response and/or ailment inquiry but has not been used to train LLM. In one or more embodiments, RALM may allow for the retrieval of newly added medical information. In one or more embodiments, RALM may allow for the use of case studies, medical reports, treatment guidelines and the like in order to generate more accurate outputs such as more accurate treatment responses. In one or more embodiments, RALM can analyze patient specific data such as physiological data and retrieve personalized treatment options (e.g. treatment response 172) based on the patient's medical history. In one or more embodiments, use of RALM may reduce hallucinations by the LLM due to vast amount of inputs. In one or more embodiments, use of RALM may increase accuracy wherein the RALM may use external data in order to generate responses.

With continued reference to FIG. 1, LLM may be operated in a sequestered enclave. As used in the current disclosure, a "sequestered enclave" may provide a secure computing environment to train A machine learning model and/or utilize an LLM with information that is sought to be protected, such as for example, physiological data. Sequestered enclave may include a trusted computing architecture. "Trusted computing," as used in this disclosure, is a technology enabling hardware and/or hardware manufacturers to exert control over what software does and does not run on a system by refusing to run unsigned software, and/or to make all software that does run auditable and transparent. In a non-limiting embodiment, trusted computing may perform one or more actions, determinations, calculations, or the like as described in this disclosure. Trusted computing may also enable integrated data privacy involving NFTs in the launching of the NFTs onto a decentralized exchange platform. Trusted computing may include a plurality of features such as, but not limited to, secure boot configured to allow an operating system to boot into a defined and trusted configuration, curtained memory configured to provide strong memory isolation, a memory configured to be unreadable by other processes including operating systems and debuggers, sealed storage configured to allow software to keep cryptographically secure secrets, secure I/O thwarts configured to attack key-stroke loggers and screen scrapers, integrity measurement configured to compute hashes of executable code, configuration data, and other system state information, and remote attestation configured to allow a trusted device to present reliable evidence to remote parties about the software it is running.

With continued reference to FIG. 1, in a non-limiting embodiment, trusted computing may include a secure coprocessor and/or crypto processor such as without limitation a Trusted Platform Module (TPM). A "Trusted Platform Module," as used in this disclosure, is a tamper resistant piece of cryptographic hardware built onto a system board or other hardware that implements primitive cryptographic functions on which more complex features can be built. In a non-limiting embodiment, TPM may be configured to serve as a local root of trust for the operations of attestation. TPM may be capable of a plurality of security measures such as, but not limited to, performing public key cryptographic operations, computing hash functions, key management and generation, secure storage of keys and other secret data, random number generation, integrity measurement, attestation, digital signatures, and the like thereof. In a non-limiting embodiment, TPM may be manufactured with a public and private key pair, or more generally a secret datum that may be verified using a secure proof, built as an endorsement key (EK) built into hardware, such as without limitation read-only memory (ROM) or the like. An "endorsement key," as used in this disclosure, is encryption key or other secret datum that is permanently embedded in Trusted Platform Module (TPM) security hardware. In a non-limiting embodiment, the EK is unique to a particular TPM and is signed by a trusted server machine such as a certification authority (CA). A "certificate authority," as used in this disclosure, is an entity that issues digital certificates.

With continued reference to FIG. 1, in a non-limiting embodiment, TPM may perform an integrity measurement to enable a user and/or process access to private data. An "integrity measurement," as used in this disclosure, is a technique to enable a party to query the integrity status of software running on a platform, e.g., through attestation challenges. In a non-limiting embodiment, an integrity measurement may include the process by which information about the software, hardware, and configuration of a system is collected and digested. For example, and without limitation, at load-time, TPM may use a hash function to fingerprint an executable, an executable plus its input data, or a sequence of such files. These hash values may be used in attestation to reliably establish code identity to remote or local verifiers such as server machine. Hash values can also be used in conjunction with a sealed storage feature. A secret may be sealed along with a list of hash values of programs that are allowed to unseal the secret. This may allow creation of data files that can only be opened by specific applications.

With continued reference to FIG. 1, TPM may also include security protocols such as attestations. An "attestation," as used in this disclosure, is a mechanism for software to prove and/or record its identity and/or execution history. Attestation may include creating a measurement, or cryptographic hash, of a process's executable code, inputs, and/or outputs, which may be signed by TPM; this may create a tamper-proof and verifiable record of exactly what process has been performed, with TPM signature proving that the measurement was performed by and/or with TPM and on the device indicated. A goal of attestation may be to prove to a remote party that an operating system, main program, and/or application software are intact and trustworthy. A verifier of an attestation may trust that attestation data is accurate because it is signed by TPM whose key may be certified by a CA. Attestation may include a remote attestation. A "remote attestation," as used in this disclosure, is method by which a host (client) authenticates its hardware and software configuration to a remote host (server). The goal of remote attestation is to enable a remote system (challenger) to determine the level of trust in the integrity of platform of another system (attestator). Remote attestation also allows a program to authenticate itself. In some embodiments, remote attestation and remote attestation is a means for one system to make reliable statements about the software it is running to another system. A remote party can then make authorization decisions based on that information. In a non-limiting embodiment, attestation may be performed by TPM configured to serve as a local root of trust for the operations of attestation. In another non-limiting embodiment, an attestation may include a direct anonymous attestation (DAA). A "direct anonymous attestation," as used in this disclosure, is a cryptographic primitive which enables remote authentication of a trusted computer whilst preserving privacy of the platform's user. Persons skilled in the art, upon reviewing the entirety of this disclosure, will be aware of the various embodiments of an attestation protocol for purposes as described herein.

Figure 2:
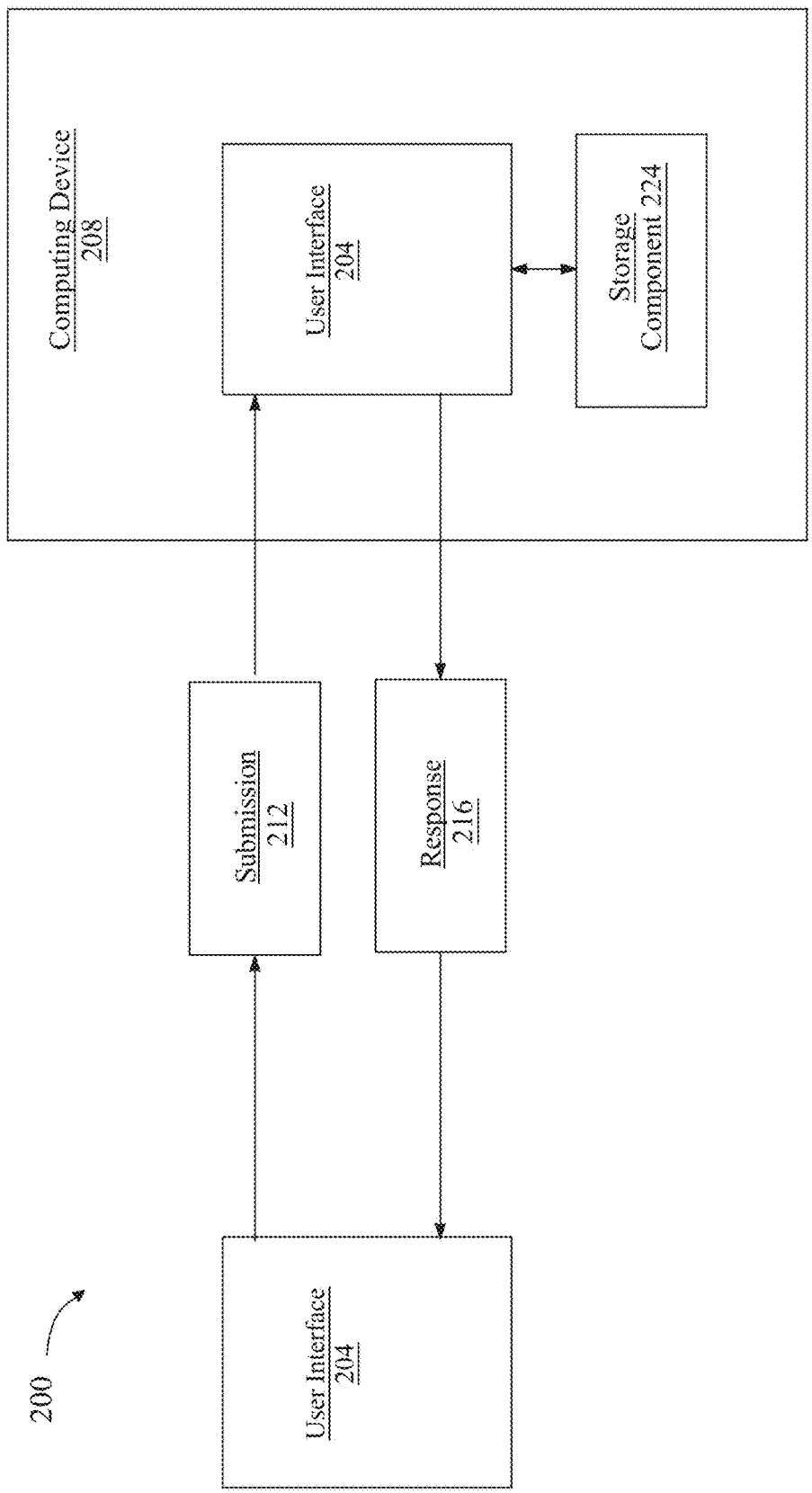
FIG. 2 is an exemplary embodiment of a chatbot system.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with computing device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 204 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device may be used by computing device 104 as an input to another function.

Figure 3:
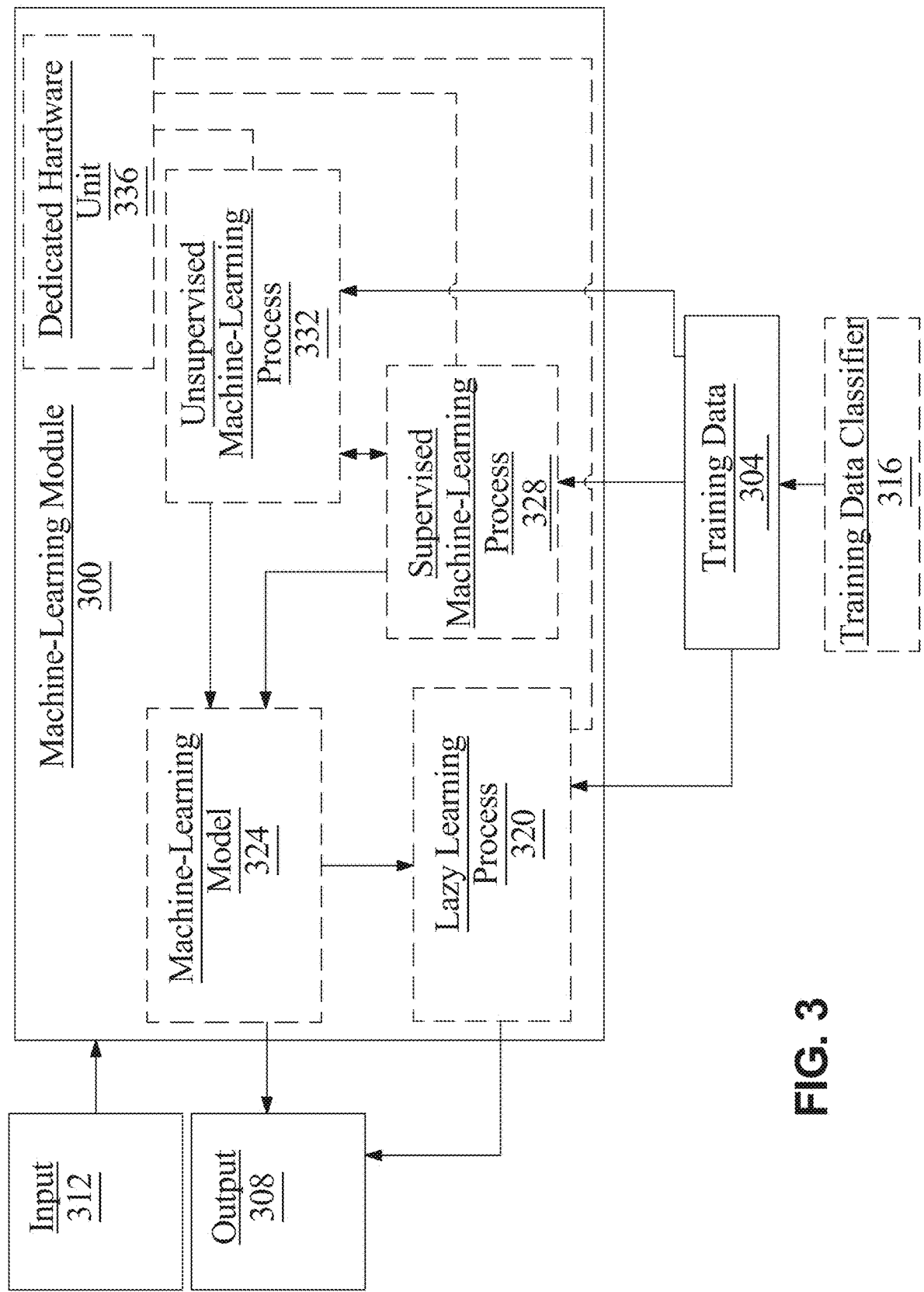
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs such as physiological data, ailment inquiry, physiological update data and the like as described above whereas outputs may include outputs such as treatment response scores, treatment update responses and the like as described above.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to classes fo people such as by gender, age, weight and the like.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as physiological data and/or physiological update data as described above as inputs, treatment responses and/or treatment update responses as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
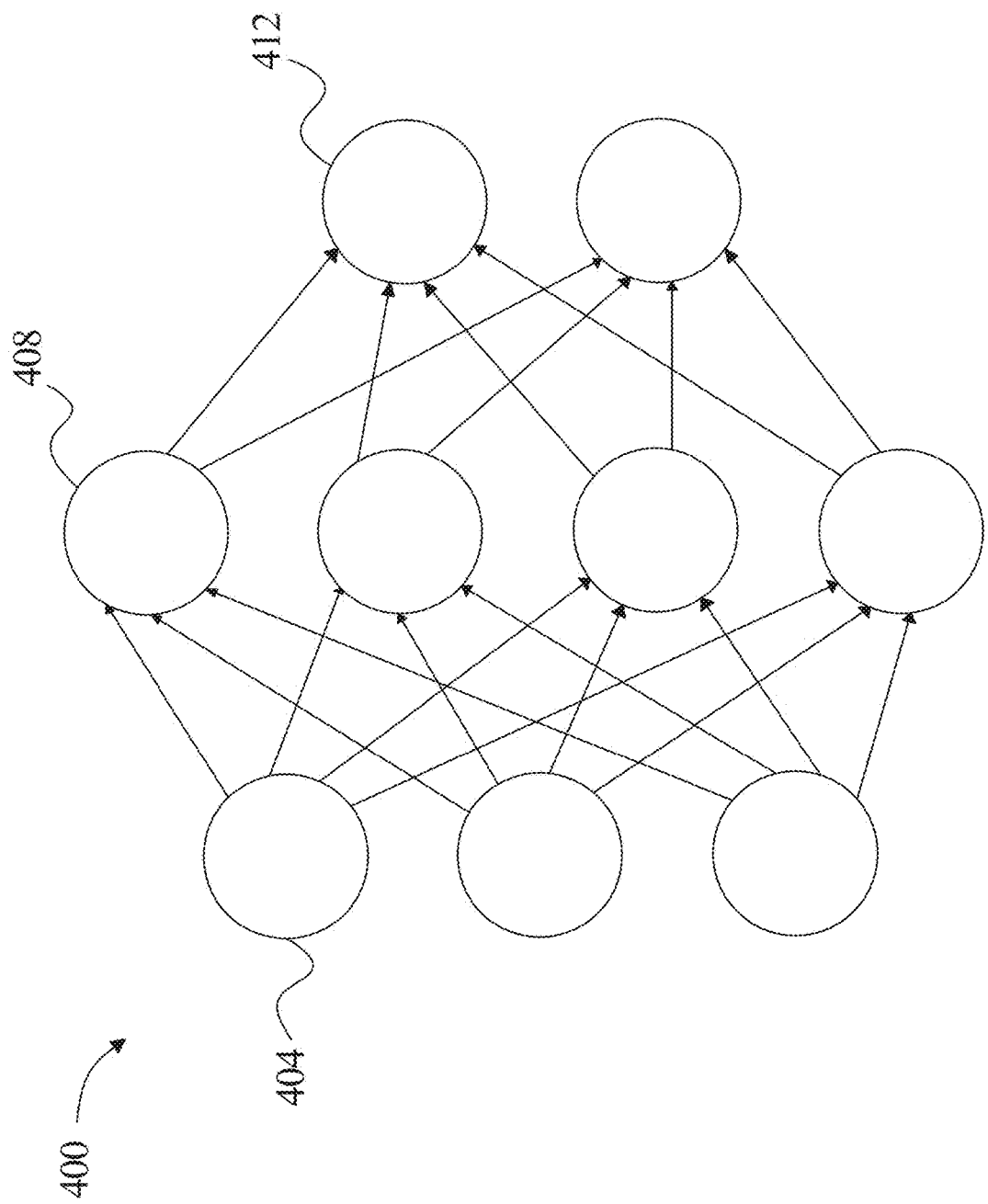
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
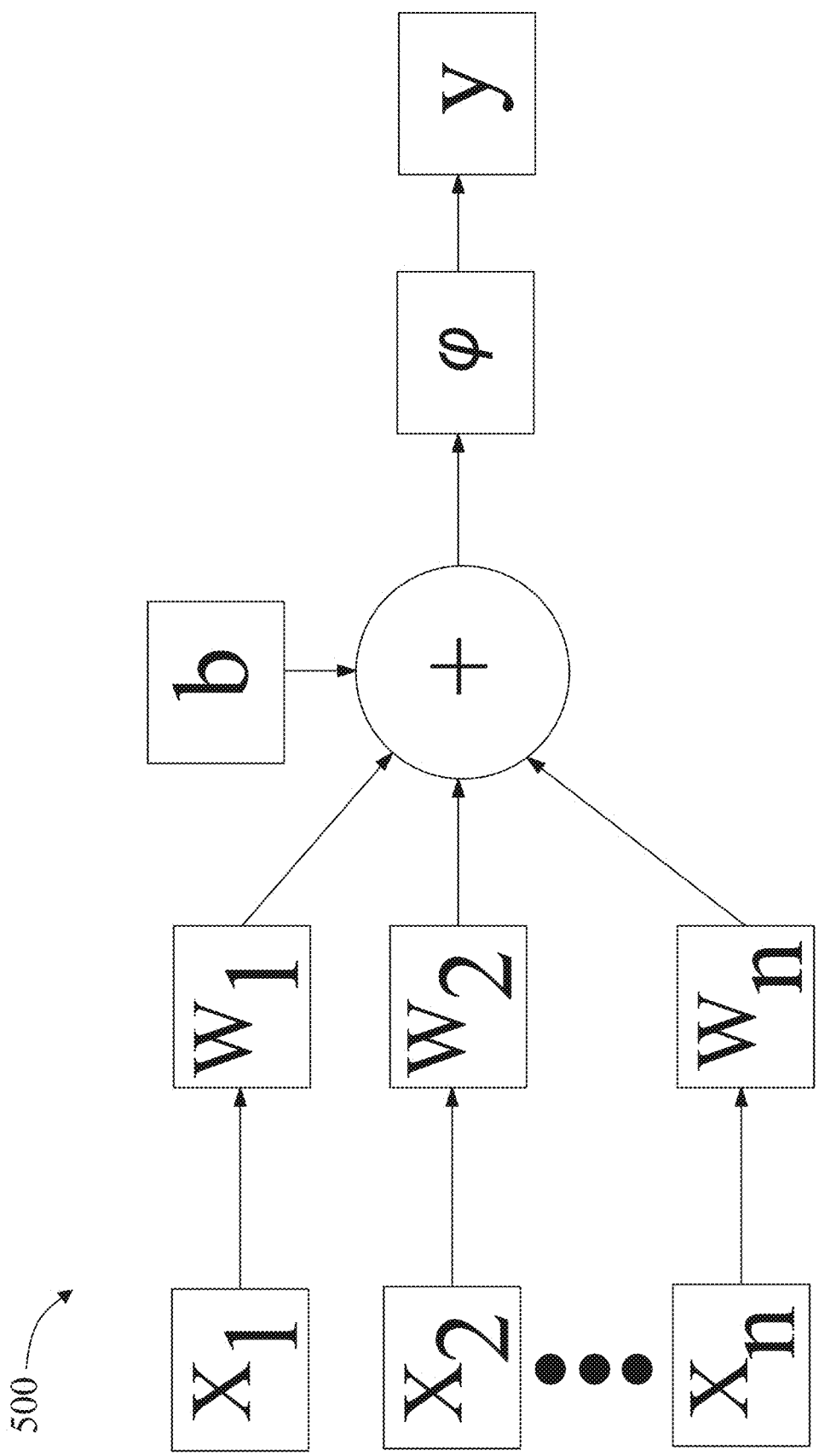
FIG. 5 is a diagram of an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $f(x)=1/1-e^{-x}$ given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
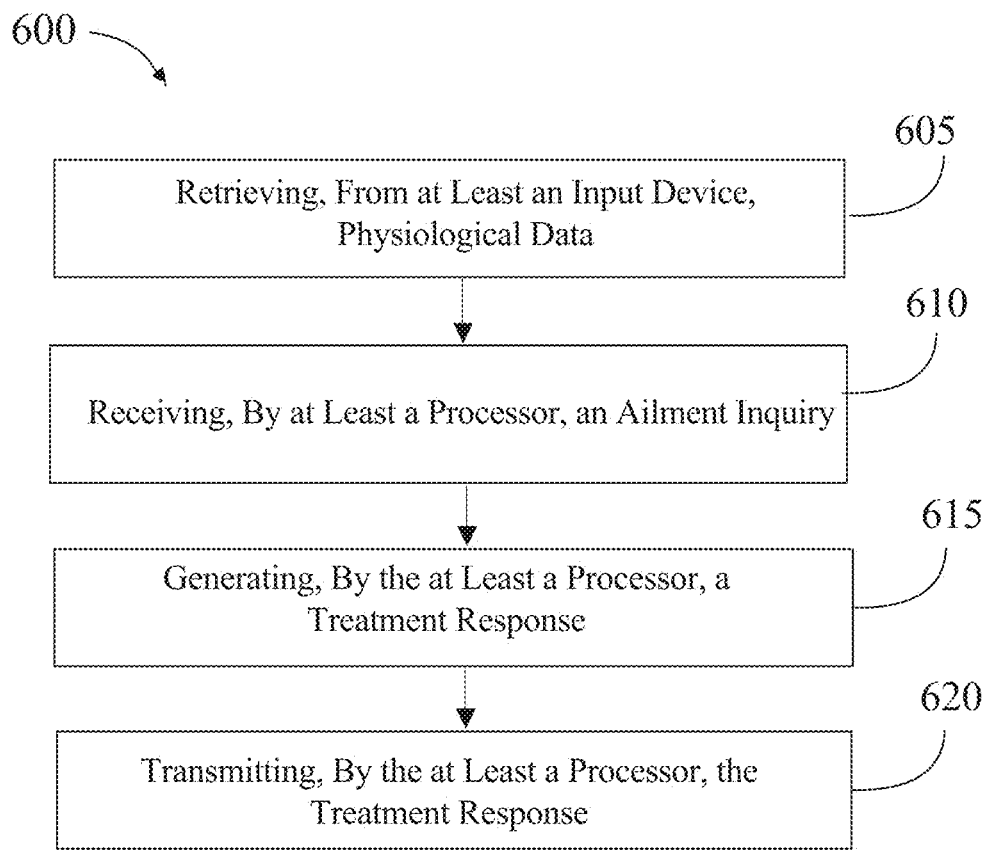
FIG. 6 is a flow diagram illustrating an exemplary embodiment of a method for personalized treatment.

Referring now to FIG. 6, an exemplary method 600 for personalized treatment is described. At step 605, method 600 includes retrieving, from at least an input device, physiological data associated with a user, wherein the physiological data further includes a previous ailment. In one or more embodiments, previous ailment includes a hereditary factor. In one or more embodiments, input device includes a wearable input device configured to receive cardiac data. In one or more embodiment, previous ailment includes one or more ailment diagnoses and a temporal element associated with each of the one or more ailment diagnoses. This may be implemented with reference to FIGS. 1-6 and without limitation.

With continued reference to FIG. 6, at step 610, method 600 includes receiving, by at least a processor an ailment inquiry from the user. In one or more embodiments, receiving, by the at least a processor, the ailment inquiry from the user includes receiving the ailment inquiry through a chatbot system, wherein the chatbot system is configured to transmit probing questions to the user through a user device. In one or more embodiments, receiving, by the at least a processor, the ailment inquiry from the user further includes receiving a first input by the user, classifying the first input to one or more ailment categorizations and generating one or more probing questions as a function of the classification. This may be implemented with reference to FIGS. 1-6 and without limitation.

With continued reference to FIG. 6, at step 615, method 600 includes generating, by the at least a processor, a treatment response as a function of the physiological data and the ailment inquiry including inputting the ailment inquiry into a large language model, generating one or more treatment responses as a function of ailment inquiry and the large language model, scoring each of the one or more treatment responses as a function of the physiological data and selecting the treatment response as a function of the scoring. In one or more embodiments, large language model includes chatbot system. In one or more embodiments, scoring each of the one or more treatment responses as a function of the physiological data includes scoring each of the one or more treatment responses as a function of the one or more previous ailment diagnoses and the one or more temporal elements. In one or more embodiments, scoring each of the one or more treatment responses includes receiving treatment training data having a plurality of physiological data correlated to a plurality of treatment responses, training a treatment machine learning model as a function of the treatment training data and scoring each of the one or more treatment responses as function of the machine learning model and the physiological data. This may be implemented with reference to FIGS. 1-6 and without limitation.

With continued reference to FIG. 6, at step 620 method 600 includes transmitting, by the at least a processor, the treatment response to at least the input device. In one or more embodiments, method 600 includes iteratively receiving, by the at least a processor, physiological update data from at least the input device and iteratively generating, by the at least a processor, one or more treatment update responses as a function of the physiological update data. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
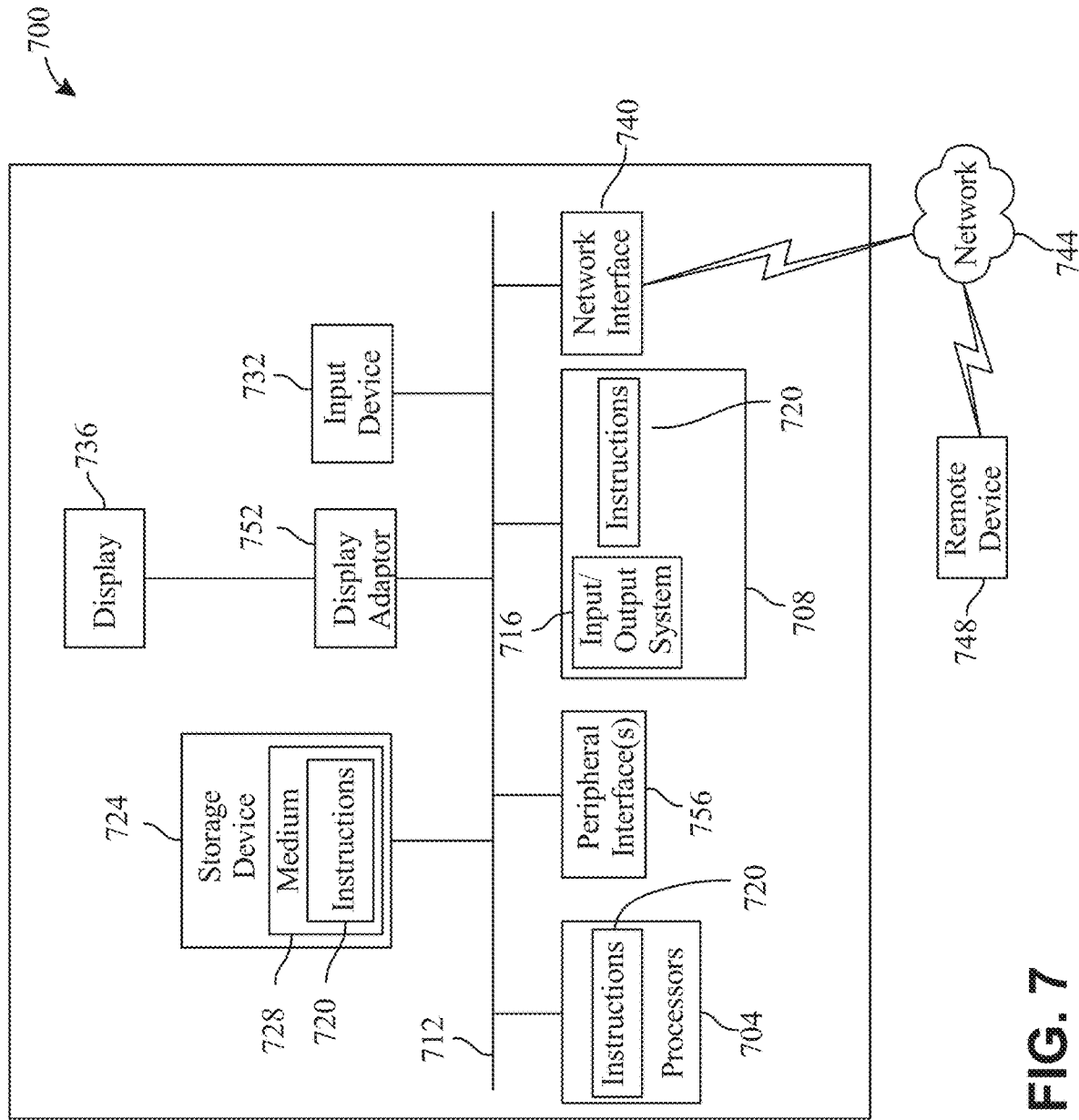
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for personalized treatment, the system comprising:
   an input device;
   at least a processor; and
   a memory communicatively connected to the at least a processor, the memory containing instructions configuring the at least a processor to:
   retrieve physiological data from at least the input device associated with a user, wherein the physiological data further comprises a previous ailment, wherein the physiological data comprises previous geographical data associated with the user;
   receive an ailment inquiry from the user;
   generate one or more treatment responses as a function of the physiological data and the ailment inquiry comprising:
   inputting the ailment inquiry into a large language model, wherein the large language model is configured to record a preferred language of the user; and
   generating the one or more treatment responses as a function of the ailment inquiry, the physiological data and the large language model, wherein at least one treatment response of the one or more treatment responses comprises an affiliate link product;
train a treatment response machine learning model using treatment response training data, wherein training the treatment response machine learning model comprises:
iteratively updating the treatment response machine learning model as a function of received physiological update data;
generate a score of each treatment response of the one or more treatment responses as a function of the treatment response machine learning model, wherein generating the score of each treatment response of the one or more treatment responses comprises:
retraining the treatment response machine learning model as a function of feedback related to an effectiveness of a treatment response of the one or more treatment responses; and
transmit the scored treatment response to at least the input device.

2. The system of claim 1, wherein the previous ailment comprises a hereditary factor.

3. The system of claim 1 wherein receiving the ailment inquiry from the user comprises receiving the ailment inquiry through a chatbot system powered by the large language model, wherein the chatbot system is configured to transmit probing questions to the user through a user device.

4. The system of claim 1, wherein receiving the ailment inquiry from the user further comprises:
receiving a first input by the user;
classifying the first input to one or more ailment categorizations; and
generating one or more probing questions as a function of the one or more ailment categorizations.

5. The system of claim 1, wherein generating the score of each of the one or more treatment responses comprises generating the score as a function of the physiological data; and
selecting a treatment response as a function of the scoring.

6. The system of claim 1, wherein the previous ailment comprises one or more ailment diagnoses and a temporal element associated with each of the one or more ailment diagnoses.

7. The system of claim 5, wherein:
the previous ailment comprises one or more ailment diagnoses and a temporal element associated with each of the one or more ailment diagnoses; and
generating the score of each of the one or more treatment responses as a function of the physiological data comprises scoring each of the one or more treatment responses as a function of the one or more ailment diagnoses and the one or more temporal elements.

8. The system of claim 5, wherein training the treatment response machine learning model further comprises:
receiving the treatment response training data comprising a plurality of physiological data correlated to a plurality of treatment responses.

9. The system of claim 1, wherein the input device comprises a wearable input device and wherein the wearable input device is configured to receive at least cardiac data.

10. The system of claim 1, wherein the processor is further configured to:
iteratively receive the physiological update data from at least the input device; and
iteratively generate one or more treatment update responses as a function of the physiological update data.

11. A method for personalized treatment, the method comprising:
retrieving, from at least an input device, physiological data associated with a user, wherein the physiological data further comprises a previous ailment, wherein the physiological data comprises previous geographical data associated with the user;
receiving, by at least a processor, an ailment inquiry from the user;
generating, by the at least a processor, one or more treatment responses as a function of the physiological data and the ailment inquiry comprising:
inputting the ailment inquiry into a large language model, wherein the large language model is configured to record a preferred language of the user; and
generating the one or more treatment responses as a function of the ailment inquiry, the physiological data and the large language model, wherein at least one treatment response of the one or more treatment responses comprises an affiliate link product;
training, by the at least a processor, a treatment response machine learning model using treatment response training data, wherein training the treatment response machine learning model comprises:
iteratively updating the treatment response machine learning model as a function of received physiological update data;
generating, by the at least a processor, a score of each treatment response of the one or more treatment responses as a function of the treatment response machine learning model, wherein generating the score of each treatment response of the one or more treatment responses comprises:
retraining the treatment response machine learning model as a function of feedback related to an effectiveness of a treatment response of the one or more treatment responses;
transmitting, by the at least a processor, the scored treatment response to at least the input device.

12. The method of claim 11, wherein the previous ailment comprises a hereditary factor.

13. The method of claim 11 wherein receiving, by the at least a processor, the ailment inquiry from the user comprises receiving the ailment inquiry through a chatbot system powered by the large language model, wherein the chatbot system is configured to transmit probing questions to the user through a user device.

14. The method of claim 11, wherein receiving, by the at least a processor, the ailment inquiry from the user further comprises:
receiving a first input by the user;
classifying the first input to one or more ailment categorizations; and
generating one or more probing questions as a function of the one or more ailment categorizations.

15. The method of claim 11, wherein generating the score of each of the one or more treatment responses comprises generating the score as a function of the physiological data; and
selecting a treatment response as a function of the scoring.

16. The method of claim 11, wherein the previous ailment comprises one or more ailment diagnoses and a temporal element associated with each of the one or more ailment diagnoses.

17. The method of claim 15, wherein:
- the previous ailment comprises one or more ailment diagnoses and a temporal element associated with each of the one or more ailment diagnoses; and
- generating the score of each of the one or more treatment responses as a function of the physiological data comprises scoring each of the one or more treatment responses as a function of the one or more ailment diagnoses and the one or more temporal elements.

18. The method of claim 15, wherein training the treatment response machine learning model further comprises:
- receiving the treatment response training data comprising a plurality of physiological data correlated to a plurality of treatment responses.

19. The method of claim 11, wherein the input device comprises a wearable input device and wherein the wearable input device is configured to receive at least cardiac data.

20. The method of claim 11, the method further comprising:
- iteratively receiving, by the at least a processor, the physiological update data from at least the input device; and
- iteratively generating, by the at least a processor, one or more treatment update responses as a function of the physiological update data.

* * * * *